United States Patent
Tornatore

Patent Number: 5,845,538
Date of Patent: Dec. 8, 1998

[54] DEVICE FOR DETECTING VEHICLE GEARBOX SELECTOR ROD POSITION

[75] Inventor: Giovanni Tornatore, S. Benigno Canavese, Italy

[73] Assignee: Magneti Marelli S.p.A, Italy

[21] Appl. No.: 841,793

[22] Filed: May 6, 1997

[30] Foreign Application Priority Data

May 7, 1996 [IT] Italy .................................. TO96A0367

[51] Int. Cl.$^6$ ............................. F16H 59/04; F16H 63/42
[52] U.S. Cl. .................................. 74/473.36; 74/DIG. 7; 116/28.1; 340/456
[58] Field of Search ............................ 74/473.13, 473.36, 74/DIG. 7; 116/28.1, DIG. 20; 340/456

[56] References Cited

U.S. PATENT DOCUMENTS 4,848,005  7/1989  Ercole et al. ............................ 33/568

FOREIGN PATENT DOCUMENTS

| 2707360 | 1/1995 | France . | |
|---|---|---|---|
| 3218143 | 11/1983 | Germany | 74/DIG. 7 |
| 1576024 | 10/1980 | United Kingdom . | |
| 2277784 | 11/1994 | United Kingdom | 74/DIG. 7 |
| WO 90/04122 | 4/1990 | WIPO | 74/DIG. 7 |
| 91/11638 | 8/1991 | WIPO . | |

OTHER PUBLICATIONS

EPO Search Report Aug. 1, 1997 EP9710 7364

*Primary Examiner*—Allan D. Herrmann
*Attorney, Agent, or Firm*—Hall, Priddy & Myers

[57] ABSTRACT

The detection device engages with a selector rod able to move in axial translation and in angular rotation to select the row of the gear and engage/disengage the gear in a vehicle gearbox. The detection device comprises a rotary sensor provided with an activating member and able to output a signal correlated with the angular position of the activating member, and a motion conversion device interposed between the activating member and the selector rod and able to convert the movements of both translation and rotation of the selector rod into a rotation of the activating member. The motion conversion device comprises a supporting part fixed on the selector rod and having a cam defining a striker surface extending along a portion of a helix, and a follower fixed on the activating member and having a contact portion able to slide along the aforesaid striker surface.

12 Claims, 2 Drawing Sheets

DEVICE FOR DETECTING VEHICLE GEARBOX SELECTOR ROD POSITION

BACKGROUND OF THE INVENTION

The present invention relates to a device for detecting the position of a selector rod for carrying out an action of selecting and an action of engaging a gear in a vehicle gearbox.

Gearboxes for vehicles, especially motor vehicles, in which a selector rod is able to move in axial translation and in angular rotation to select the row of the gears of the gearbox and engage/disengage them, are known.

Devices for detecting selector rod position, comprising two position sensors connected to the rod and outputting signals correlated with the axial position and angular position, respectively, of the selector rod, are also known. These signals are conveniently fed to an electronic processing circuit that outputs a single information signal indicating the axial and angular position of the selector rod.

However, these devices suffer from the drawbacks that they are quite complex and expensive and that the position measurements they make are indirect.

SUMMARY OF THE INVENTION

It is an object of the present invention to provide a device for detecting the axial and angular position of a selector rod that is simple and reliable and gives a direct reading of the axial and angular position of the selector rod.

The present invention provides a device for detecting the position of a selector rod for carrying out an action of selecting a gear row and an action of engaging/disengaging the selected gear in a vehicle gearbox, said rod being able to move in axial translation for one of said actions and in angular rotation about its longitudinal axis for another of said actions, said selector rod also being able to adopt, for each gear row, a neutral position and two positions of gear engagement, said device being characterized in that it comprises sensor means provided with an angularly mobile activating member and able to output a signal S correlated with the angular position of the activating member and motion conversion means interposed between said selector rod and said activating member to convert each of said movements of axial translation and of angular rotation of said selector rod into a single rotary movement of said activating member.

BRIEF DESCRIPTION OF THE DRAWINGS

To enable this invention to be understood more clearly a preferred embodiment will now be described, merely by way, of a non-limiting example, with reference to the accompanying drawings, in which.

DETAILED DESCRIPTION OF THE INVENTION

Figure 1:
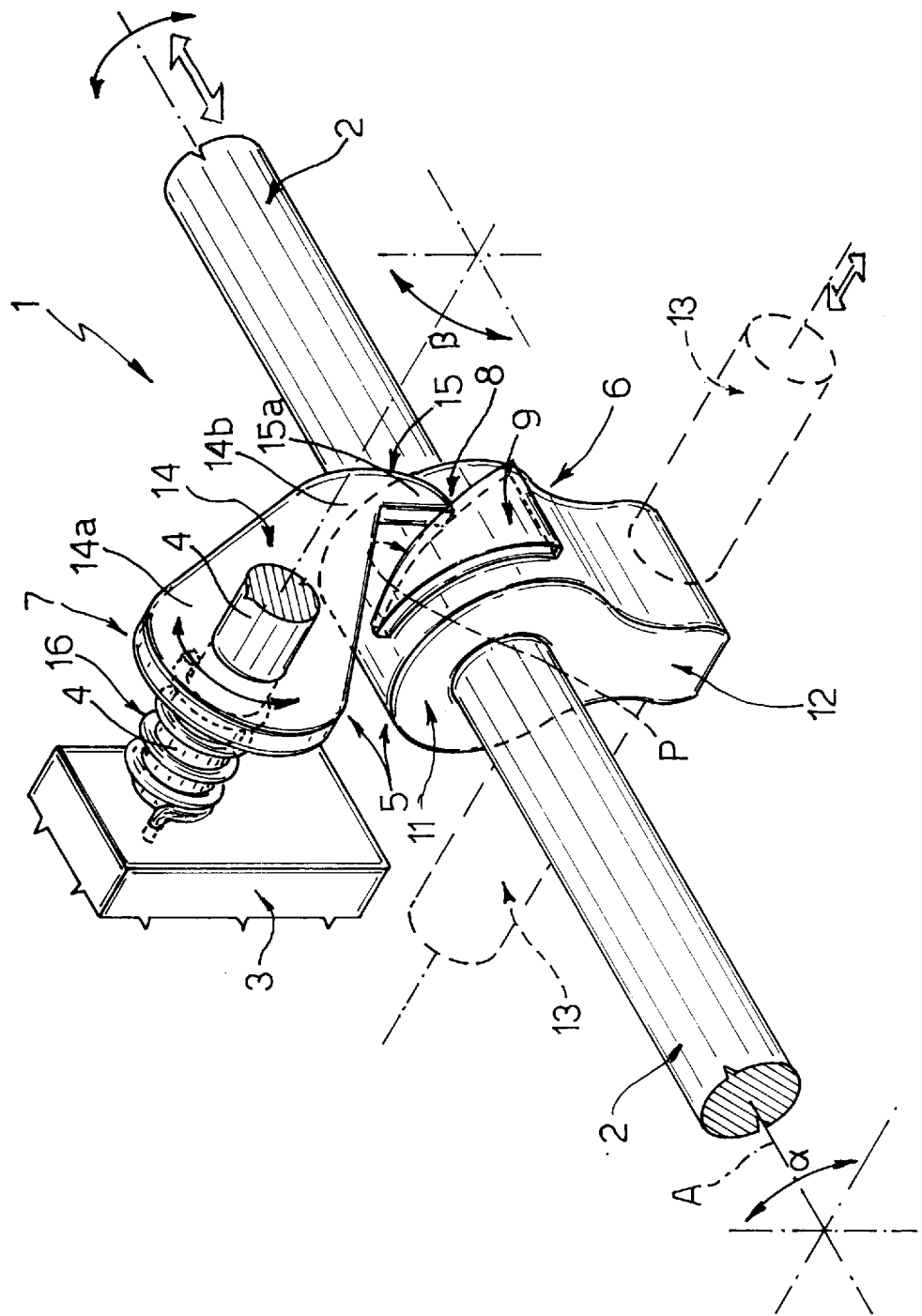
FIG. 1 shows in perspective a device for detecting the position of a selector rod made in accordance with this invention.

In FIG. 1 the numeral 1 indicates, as a whole, a device for detecting the axial and angular position of a selector rod 2 of a vehicle gearbox (not shown).

The selector rod 2 is able, in the embodiment described, to move in translation along its longitudinal axis A to select the row of the gear and in angular rotation about the axis A through a given angle $\alpha$ to engage/disengage the selected gear. In particular, in each row, the selector rod 2 can adopt a central neutral position and two opposing lateral positions of gear engagement that are angularly equidistant from the central position.

Figure 2:
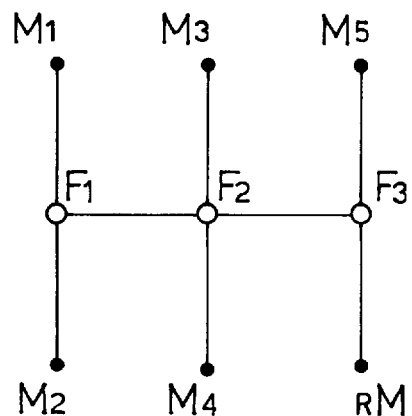
FIG. 2 is a simplified diagram of the positions of engagement and selection adopted by the selector rod.

As the example makes clear, FIG. 2 shows a simplified diagram of the positions of engagement and selection of the selector rod; in this diagram the letters $F_1$, $F_2$, $F_3$ denote the central neutral positions of the rows that are selectable by translational movements of the selector rod 2, while the letters $M_1$, $M_2$, $M_3$, $M_4$, $M_5$, RM denote the lateral positions of gear engagement obtained by angular rotations of the selector rod 2 about the axis A.

In a similar way the selector rod 2 could be rotated angularly about the axis A to select the gear row and moved in translation along the axis A to engage/disengage the selected gear.

The detection device 1 comprises (FIG. 1) a rotary sensor 3, for example a potentiometer, provided with an activating member 4 and able to output an electric signal correlated with the angular position $\beta$ of the activating member 4, and a motion conversion device 5 interposed between the activating member 4 and the selector rod 2 to convert the aforesaid movements of both translation and rotation of the selector rod 2 into a rotary movement of the activating member 4.

More specifically, the motion conversion device 5 comprises a first and a second striker parts 6, 7 that slide over each other and are integrally connected to the selector rod 2 and activating member 4 respectively.

The first striker part 6 comprises a supporting part 8 fixed on the selector rod 2 and having a cam 9, while the second striker part 7 consists of a follower in sliding contact with the cam 9. More specifically, the cam 9 is defined by a striker surface P extending along a portion of a helix having a given helix angle $\gamma$, and the follower 7 is in sliding contact with the cam 9 along the aforesaid striker surface P.

The supporting part 8 comprises a main portion 11 of generally cylindrical shape fixed on the selector rod 2 and a secondary integral portion 12 that extends radially away from the main portion 11 and is generally parallelepipedal in shape with rounded edges.

The secondary portion 12 is coupled to an actuator rod 13 (shown in broken lines) extending transversely to the selector rod 2 and axially mobile in both directions for pushing or pulling the secondary portion 12 in order to cause an angular rotation in opposite directions through the angle $\alpha$ of the selector rod 2 about the axis A.

According to this invention, the cam 9 is produced in the form of a body that projects out of the lateral surface of the main portion 11 and in plan view is approximately triangular.

The follower 7 comprises an elongate connecting portion 14 extending radially from the activating member 4 with a first end portion 14a fixed on the activating member 4 and a second end portion 14b from which extends an integral tooth 15 with a contact portion 15a able to slide along the striker surface P. More specifically, to each movement of the tooth 15 along the striker surface P, caused by an axial or angular movement of the selector rod 2, there corresponds a rotary movement of the activating member 4 through an angle $\beta$ correlated with the helix angle $\gamma$ of the portion of helix along which the striker surface P extends.

Figure 3:
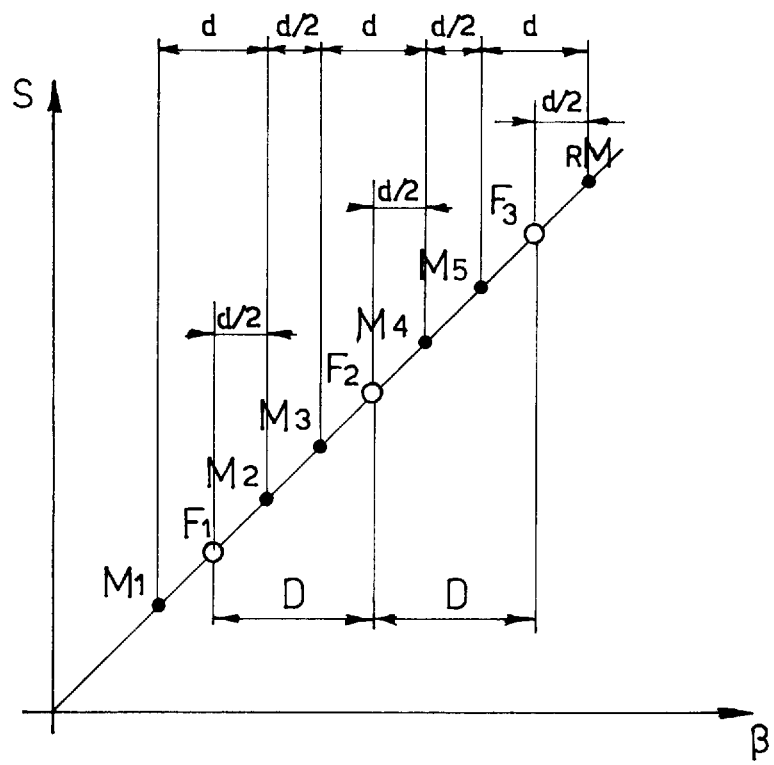
FIG. 3 shows a signal S output by the detection device as a function of the row selected and of the gear engaged.

The value of the helix angle γ is decided in such a way as to obtain a signal S output by the rotary sensor 3 that is a function of the angular position β of the activating member 4 of this sensor 3 like that shown in FIG. 3; also shown in this figure are the same letters from FIG. 2 indicating the selected row and the engaged gear corresponding to the value of the angular position β.

More precisely, the helix angle γ of the portion of helix along which the striker surface P extends defines a conversion relationship in which, lying between two angular positions β of the activating member 4 corresponding to respective neutral selector rod 2 positions belonging to adjacent rows, e.g. $F_1$ and $F_2$ or $F_2$ and $F_3$, there are two intermediate angular positions β of the activating member 4 corresponding to respective positions of gear engagement of the selector rod 2 that each belong to a different one of the aforesaid adjacent rows—in the present example $M_2$ and $M_3$ or $M_4$ and $M_5$, respectively. Furthermore, in accordance with this conversion relationship these positions of gear engagement correspond to gears arranged in consecutive order and each of the intermediate angular positions β is approximately equidistant from the angular positions β of the activating member 4 corresponding on the one hand to the neutral position of that particular row, and on the other hand to the neighbouring position of gear engagement of the adjacent row.

More precisely, as illustrated in FIG. 3, the helix angle γ of the portion of helix around which the striker surface P extends defines a conversion relationship in which a first set of differences D, each calculated between two angular positions β of the activating member 4 corresponding to respective neutral selector rod 2 positions belonging to adjacent rows, e.g. $F_1$ and $F_2$ or $F_2$ and $F_3$, are approximately equal to each other and a second set of differences d, each calculated between two angular positions β of the activating member 4 corresponding to respective positions of gear engagement of the selector rod 2 belonging to one particular row, that is, in this example $M_1$ and $M_2$ or $M_3$ and $M_4$, respectively, are approximately two thirds of each of the first differences D.

In addition, each difference calculated between two angular positions β of the activating member 4 corresponding to respective positions of gear engagement of the selector rod 2 in adjacent rows and indicated by numerically consecutive subscripts in FIG. 2, e.g. $M_2$ and $M_3$, is approximately equal to one half of each of the second differences d and each difference calculated between two angular positions β of the activating member 4 corresponding respectively to a neutral position and a position of gear engagement of the selector rod 2 in one particular row, e.g. $F_1$ and $M_2$ or $F_1$ and $M_1$, is also approximately equal to one half of each of the second differences d.

Owing therefore to the geometrical relationship between D and d, the points indicated by letters in FIG. 3 are equidistant and each is a distance d/2 from the immediately adjacent point. In this way the signal S increases monotonically and thus enables the selected row and the engaged gear to be identified unambiguously.

The detection device 1 also comprises (FIG. 1) opposing parts 16 (shown schematically) connected to the follower 7 for keeping the contact portion 15a of the tooth 15 pressed against the striker surface P; these opposing parts 16 may for example be of elastic type and in particular, as shown in FIG. 1, may take the form of a helical torsion spring.

In use, to each translational movement of the selector rod 2 caused by selecting a gear there corresponds a translation of the striker surface P parallel to the axis A. The translation of the surface P consequently moves the follower 7 in sliding contact with this surface P and turns the activating member 4.

Similarly, to each movement of angular rotation of the selector rod 2 caused by engaging/disengaging a gear there corresponds a rotation of the striker surface P about the axis A. The rotation of the surface P consequently moves the follower 7 and turns the activating member 4.

The shape of the cam 9 described above permits a one-to-one relationship to be established between an axial and angular position of the selector rod 2 and an angular position of the activating member 4. The rotary movement of the activating member 4 causes a change in the value of the output signal S of the rotary sensor 3, which can therefore be used to identify the axial and angular position of the selector rod 2 unambiguously.

The advantages of the present detection device 1 are these: firstly, it directly outputs a single electrical signal correlated unambiguously with the angular and axial position of the selector rod 2. Secondly, the detection device 1 is simple, reliable, inexpensive to manufacture and compact.

Lastly, it will be clear that modifications and variations may be applied to the detection device 1 described above and illustrated without thereby departing from the scope of this invention. For example, the cam 9 could take the form of a groove (not shown) in the lateral surface of the main portion 11.

I claim:

1. Device (1) for detecting the position of a selector rod (2) for carrying out an action of selecting a gear row and an action of engaging/disengaging the selected gear in a vehicle gearbox, said rod (2) being able to move in axial translation for one of said actions and in angular rotation about its longitudinal axis (A) for another of said actions, said selector rod (2) also being able to adopt, for each gear row, a neutral position and two positions of gear engagement, said device (1) being characterized in that it comprises sensor means (3) provided with an angularly mobile activating member (4) and able to output a signal S correlated with the angular position (β) of the activating member (4) and motion conversion means (5) interposed between said selector rod (2) and said activating member (4) to convert each of said movements of axial translation and of angular rotation of said selector rod (2) into a single rotary movement of said activating member (4).

2. Device according to claim 1, characterized in that said motion conversion means (5) comprise first and second striker means (6, 7) which slide against each other; said first striker means (6) being connected to said rod (2) and said second striker means (7) being connected to said activating member (4).

3. Device according to claim 2, characterized in that said first and second striker means (6, 7) comprise a supporting part (8) with a cam (9), and a follower (7) in sliding contact with said cam (9).

4. Device according to claim 3, characterized in that said cam is defined by a striker surface (P) extending along a portion of a helix having a given helix angle (γ) and said follower (7) is in sliding contact with said cam (9) along said striker surface (P).

5. Device according to claim 3, characterized in that said supporting part (8) is integrally connected to said selector rod (2).

6. Device according to claim 3, characterized in that said supporting part (8) comprises a main portion (11) of generally cylindrical shape integrally connected to said selector rod (2) and said cam (9) comprises a body projecting from the lateral surface of said main portion (11).

7. Device according to claim 3, characterized in that said follower (7) is integrally connected to said activating member (4).

8. Device according to claim 3, characterized in that said follower (7) comprises an elongate connecting portion (14) extending radially from said activating member (4) with a first end portion (14a) fixed on this activating member (4) and a second end portion (14b) from which extends a tooth (15) with a contact portion (15a) able to slide along said striker surface (P).

9. Device according to claim 8, characterized in that it comprises opposing means (16) connected to said follower (7) for keeping said contact portion (15a) of said tooth (15) pressed against said striker surface (P).

10. Device according to claim 1, characterized in that said motion conversion means define a conversion relationship in which, lying between two angular positions ($\beta$) of the activating member (4) corresponding to respective neutral selector rod (2) positions ($F_1$, $F_2$, $F_3$) belonging to adjacent rows, there are two intermediate angular positions ($\beta$) of the activating member (4) corresponding to respective positions of gear engagement ($M_2$–$M_3$, $M_4$–$M_5$) of the selector rod (2) that each belong to a different adjacent row; and in that the gears corresponding to said respective positions of gear engagement ($M_2$–$M_3$, $M_4$–$M_5$) are in consecutive order and each of said intermediate angular positions ($\beta$) is approximately equidistant from the angular positions ($\beta$) of the activating member (4) corresponding on the one hand to the neutral position ($F_1$, $F_2$, $F_3$) of that particular row, and on the other hand to the neighbouring position of gear engagement ($M_2$–$M_3$, $M_4$–$M_5$) of the adjacent row.

11. Device according to claim 1, characterized in that said motion conversion means define a conversion relationship in which a first set of differences (D), each calculated between two angular positions ($\beta$) of the activating member (4) corresponding to respective neutral selector rod (2) positions ($F_1$, $F_2$, $F_3$) belonging to adjacent rows, are approximately equal to each other and a second set of differences (d), each calculated between two angular positions ($\beta$) of the activating member (4) corresponding to respective positions of gear engagement ($M_1$–$M_2$, $M_3$–$M_4$, $M_5$RM) of the selector rod (2) belonging to one particular row, are approximately two thirds of each of said first differences (D).

12. Device according to claim 11, characterized in that each difference calculated between two angular positions ($\beta$) of the activating member (4) corresponding, respectively, to a neutral position and a position of gear engagement of the selector rod (2) in one particular row is approximately equal to one half of each of said second differences (d).

\* \* \* \* \*